Oct. 26, 1926.
W. SECK
1,604,488
ROTARY VALVE
Filed Nov. 21, 1925
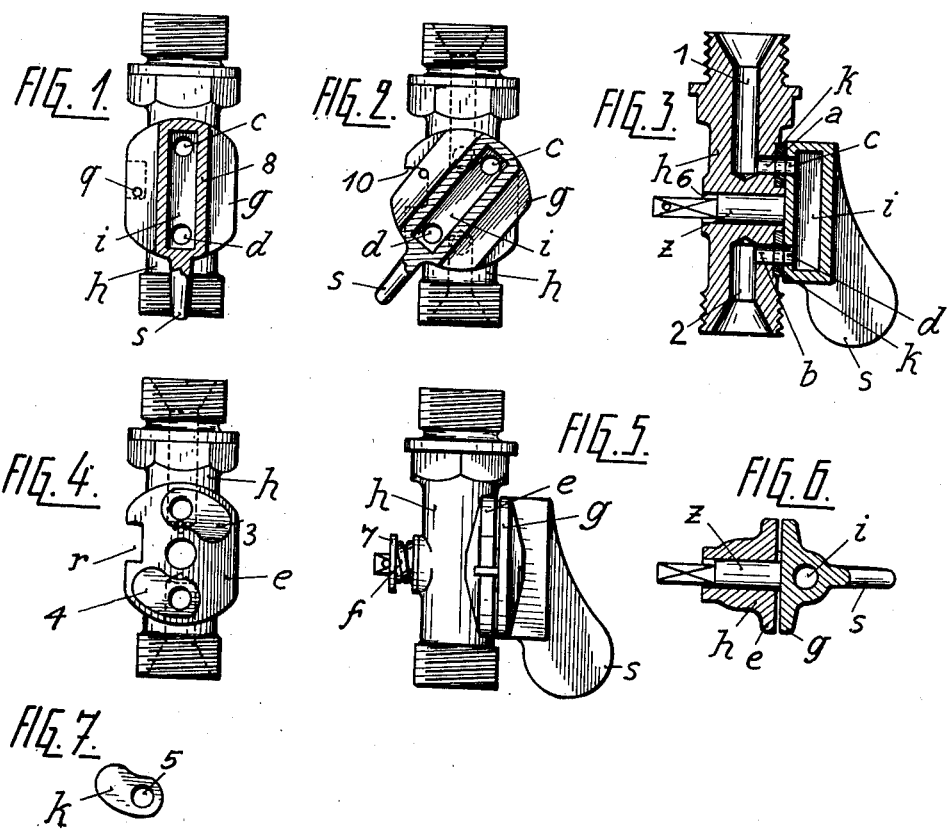
Inventor:
Willy Seck
by Reinlaw
Atty.

Patented Oct. 26, 1926.

1,604,488

UNITED STATES PATENT OFFICE.

WILLY SECK, OF BERLIN-WILMERSDORF, GERMANY.

ROTARY VALVE.

Application filed November 21, 1925, Serial No. 70,636, and in Germany January 5, 1925.

My invention refers to valves, more especially of the kind in which a rotary body opens or bars the passage to a liquid or gaseous medium, this body gliding with a plane surface past the ends of the two conduits to be placed in communication and which may extend at an angle or in parallel to each other. It is an object of my invention to provide means whereby the contacting parts of the rotary body and the ends of the conduits are packed in a simpler and more efficient manner than has hitherto been the case.

As is well known, the valves or cocks customarily in use in the fuel conduits of internal combustion engines, more especially the motors of motor vehicles, do not keep tight, the rotary valve member soon allowing petrol to pass through without it being possible to obviate this drawback altogether by regrinding. It has been tried to overcome this difficulty by means of rotary disc valves having two plane surfaces contacting with each other and which were packed by means of a circular packing disc made of cork or the like. In order, however, that the packing be kept tight permanently, the contacting surfaces must be pressed against each other with comparatively high pressure inasmuch as the pores of the cork will allow liquid or vapours to pass through unless being closed by a corresponding pressure. Such pressure, however, renders it difficult to operate these valves.

In the valve according to the present invention, in which a body which is formed to offer a passage to the liquid or gas, is mounted for rotary motion on a plane surface, into which open the two conduits to be placed in communication with each other the ends of these conduits are surrounded by cavities in which are inserted small plates consisting of cork or similar material which serve for packing the body relative to these conduits and for preventing liquid or gas from escaping between the contacting parts. In order, however, to prevent the escape of that quantity of liquid or gas, which remains in the rotary body, after this latter has been operated to sever the communication, these cork plates have an oblong form so that beside the perforated portion which offers a passage to the liquid or gas, there is provided a plain portion which closes the passage openings in the rotary body also when this latter is in its closing position. Inasmuch as a great many of these small cork plates can be cut from a sheet of cork which as a rule presents a greater number of large pores unfit for use as a packing, the new valve can be packed more efficiently and at less cost than similar valves hitherto in use.

In the drawings affixed to this specification and forming part thereof one form of valve embodying my invention is illustrated diagrammatically by way of example.

In the drawings—

Figs. 1 and 2 are plan views, partly in horizontal section, showing the rotary body in open and closed position.

Fig. 3 is an axial section corresponding to Fig. 1.

Fig. 4 is a plan view in which the rotary body is omitted.

Fig. 5 is a side elevation and Fig. 6 is an axial cross section of the rotary body and its seat.

Fig. 7 is a plan view of a cork packing.

1 and 2 are parts of a conduit which shall be connected with or separated from each other. The casting $h$, of which these conduits form part, is formed with two passages $a$ and $b$ communicating with the conduits 1 and 2, respectively, and extending through the wall of the casting $h$ at right angles to the conduits. A plane surface $e$ is formed on the casting $h$, into which the passages $a$ and $b$ open. These passages are surrounded by depressions or cavities 3, 4 having substantially the form of short ring segments, each cavity extending from the respective passage $a$ or $b$ towards an opposite side. In each cavity is mounted a small cork plate $k$ (Fig. 7) having also the form of a ring segment with a perforation 5 near one end. This perforation is positioned in the cavity so as to register with the respective passage $a$, $b$.

The rotary body replacing the ordinary valve member has the form of a disc $g$ resting on the surface $e$, a stem $z$ fixed to the disc extending through a passage 6 which extends through the casting $h$ intermediate the two conduits 1 and 2. The stem $z$ is secured on the other side of the casting by means of a disc 7 or the like, a coil spring $f$ inserted between the casting and the disc 7 tending to hold the disc $g$ firmly applied against the contact surface $e$ and the cork plates $k$, respectively. On the disc $g$ is mounted a case 8 ending in a handle $s$. Holes $c$ and $d$ in the disc are arranged to register with the holes 5 of the cork plates and the passages $a$, $b$, respectively, and to place these latter in communication with the interior $i$ of the case, when the rotary body or disc is in its open position (Figs. 1 and 3), where it offers a passage to the liquid or vapour flowing in the conduits 1 and 2. In this position a liquid may for instance pass from conduit 1 through passage $a$, hole 5 hole $c$, the interior $i$ of case 8, holes $d$ and 5 and passage $b$ into conduit 2.

Obviously, when the rotary body or disc is in its closing position (Fig. 2) wherein it is stopped by a pin $q$ on the rotary disc moving in a notch 10 of the casting $h$, the holes $c$, $d$ will be closed by the full portions of the cork plates $k$ so that the liquid or gas enclosed in the hollow $i$ of the case cannot escape.

I wish it to be understood that I do not desire to be limited to the exact details of construction shown and described, for obvious modifications will occur to a person skilled in the art.

I claim:—

1. A valve comprising a valve body having a plane surface, and two conduits ending in said surface, a valve member mounted on said body for rotation in parallel with said surface and being provided with a passage, the ends of which can be made to register with the ends of said conduits, and a perforated packing plate surrounding one of each pair of registering ends, said plates having the form of ring segments, one half of which is perforated, the other half plain.

2. A valve comprising a body with two spaced axial conduits extending from the ends of the body and branch conduits extending through a side wall of said body at an angle to the inner ends of said axial conduits, a valve stem rotatably extending through and secured in said body intermediate said branch conduits, a plane surface on the side wall of said body into which said branch conduits end, a valve member mounted on said stem and having a plane surface in parallel with the plane surface of said body and a passage extending through said valve member, both ends of said passage extending into the plane surface of said valve member and spaced apart to register with the ends of said branch conduits and a separate packing plate extending around one of each pair of registering ends and some distance beyond said end in the direction of rotation of said valve member.

In testimony whereof I affix my signature.

WILLY SECK.